A. D. Kendig,
Bridle.
N°. 59,316.        Patented Oct. 30, 1866.
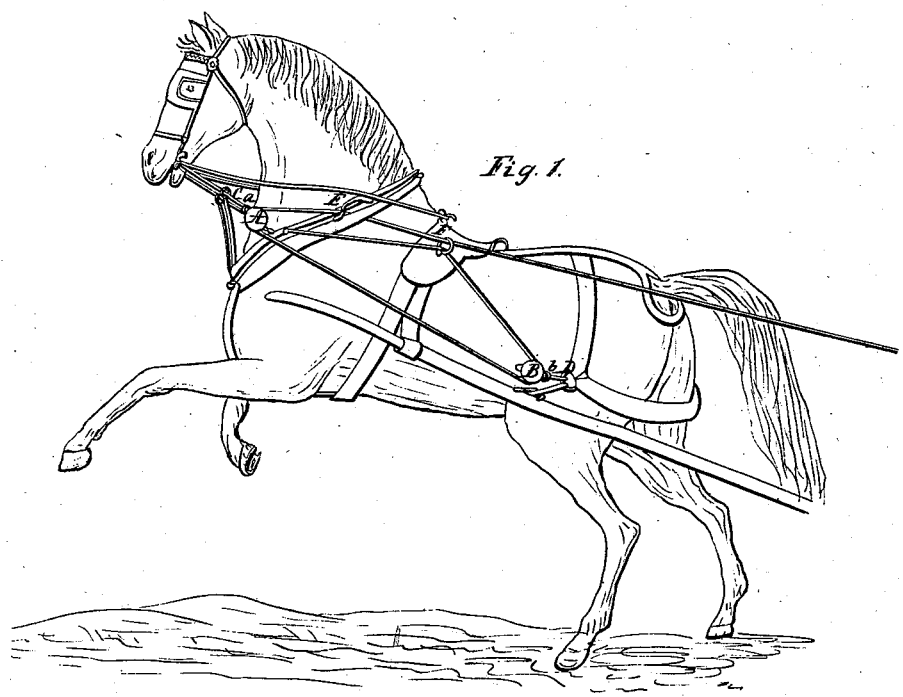
Fig. 1.
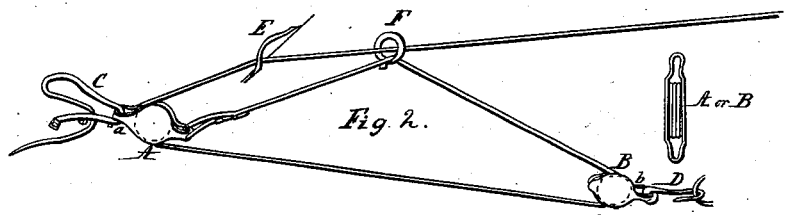
Fig. 2.
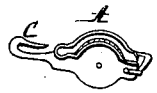
Witnesses:
John S. Rise
Adam Miller
Inventor:
Amos D. Kendig

UNITED STATES PATENT OFFICE.

AMOR D. KENDIG, OF SAFE HARBOR, PENNSYLVANIA, ASSIGNOR TO HIMSELF AND JOHN MILLER.

IMPROVEMENT IN HARNESS.

Specification forming part of Letters Patent No. 59,316, dated October 30, 1866.

*To all whom it may concern:*

Be it known that I, AMOR D. KENDIG, of Safe Harbor, in the county of Lancaster and State of Pennsylvania, have invented a new and improved mode of attaching lines for increasing the power and control over horses when in harness and attached to vehicles; and I do hereby declare that the following is a full and exact description thereof, reference being had to the accompanying drawings, making a part of this specification, in which—

Figure 1 shows the application of my line and pulleys on the horse; Fig. 2, the same with its connecting parts separately shown.

The nature of my invention consists in the use of one or two pulleys, A and B, having eyes formed by the prolonged sides, as shown, in combination with an ordinary line, (made of round leather, in part at least, which is preferable to the common flat line.) One end of the line on each side of the horse is fastened to the posterior ring or eye of the pulley A by its strap and buckle, instead of being fastened to the ring of the bit of the bridle, then passed upward and through the ring F on the saddle of the harness, then down through the opening in the rear of the pulley B, and carried forward under and through the anterior opening of the pulley A, and over it through the loop E on the hames, and back again through the aforesaid ring F to the hand of the driver.

The pulley A is then connected by its anterior eye to the bit of the bridle, and the pulley B, by a hook or strap and buckle, is connected with the ring D of the breech-band of the harness, as shown by Figs. 1, 2.

The mechanical power of the pulley is well known, and their application in conjection with the line and the bit of the horse and breech-band affords a power over the horse that must be tested before it can be fully appreciated. The most vicious horse is readily brought into subjection without endangering the rupture of the mouth. It will draw his head and breech toward each other in a manner so as wholly to prevent him from rearing or kicking, and gives him to feel his utter inability to do otherwise than obey.

I am aware that pulleys have before been used in connection with lines for driving horses, and therefore I do not claim them irrespective of their arrangement; but What I do claim is—

The pulley A, attached to the bit, in combination with the pulley B, attached to the breeching, and having the line arranged in connection therewith, as shown and described.

AMOR D. KENDIG.

Witnesses:
JOHN S. KISE,
ADAM MILLER.